(12) United States Patent
Schilling

(10) Patent No.: US 6,269,092 B1
(45) Date of Patent: Jul. 31, 2001

(54) SPREAD-SPECTRUM CHANNEL SOUNDING

(75) Inventor: Donald L. Schilling, Palm Beach Gardens, FL (US)

(73) Assignee: Linex Technologies, Inc., West Long Branch, NJ (US)

( * ) Notice: Subject to any disclaimer, the term of this patent is extended or adjusted under 35 U.S.C. 154(b) by 0 days.

(21) Appl. No.: 09/231,015

(22) Filed: Jan. 14, 1999

(51) Int. Cl.$^7$ .................................................. H04B 7/216
(52) U.S. Cl. ........................ 370/342; 370/335; 375/142; 375/143
(58) Field of Search ............................ 395/130; 375/144, 375/136, 140, 147, 148, 132; 370/342, 335

(56) References Cited

U.S. PATENT DOCUMENTS

| | | |
|---|---|---|
| 6,070,085 | 5/2000 | Bender et al. . |
| 6,075,974 | 6/2000 | Saints et al. . |
| 6,101,168 | 8/2000 | Chen et al. . |
| 6,215,811 * | 4/2001 | Yuen ..................... 375/143 |
| 6,222,833 * | 4/2001 | Seo ....................... 370/342 |
| 6,226,316 * | 5/2001 | Schilling et al. ..................... 375/142 |

* cited by examiner

Primary Examiner—Chi Pham
Assistant Examiner—Dung X. Nguyen
(74) Attorney, Agent, or Firm—David Newman; Chartered

(57) ABSTRACT

An improvement to a spread-spectrum code-division-multiple-access system, using a channel sounding signal from a base station (BS) to provide initial transmitter power levels for remote stations (RS). The base station has a BS-spread-spectrum transmitter for transmitting BS-spread-spectrum signals at a first frequency and a BS-spread-spectrum receiver for receiving RS-spread-spectrum signals at a second frequency. The RS-spread-spectrum signals are transmitted by the remote stations at the second frequency. The BS-spread-spectrum signals at the first frequency are outside the correlation bandwidth of the RS-spread-spectrum signals at the second frequency. The base station has a BS transmitter for transmitting a BS-channel-sounding signal at the same carrier frequency being used by the remote stations to transmit a spread-spectrum signal to the base station. The bandwidth of the BS-channel-sounding signal is much of the bandwidth of the BS-spread-spectrum signal. Each of the remote stations has an RS receiver, for receiving the BS-channel-sounding signal at the second frequency. Each RS receiver includes an RS demodulator for tracking the BS-channel-sounding signal and outputting an RS-receiver signal, and an RS-power-level circuit. In response to the RS-receiver signal, the RS-power-level circuit adjusts the initial RS-power level. The base station has an interference-reduction subsystem, located at a front end to the BS-spread-spectrum receiver. The interference-reduction subsystem reduces the BS-channel-sounding signal, transmitted from the base station, from the RS-spread-spectrum signal arriving at the base station.

34 Claims, 5 Drawing Sheets

SPREAD-SPECTRUM CHANNEL SOUNDING

BACKGROUND OF THE INVENTION

This invention relates to code-division-multiple-access communications, and more particularly to power settings for a remote station, when initiating communications with a base station.

DESCRIPTION OF THE RELEVANT ART

The terrestrial communications channel is typically non-reciprocal. If a base station 12 transmitted, as shown in FIG. 1, at a first power level $P_1$ and at a first frequency $f_1$, a first signal to a remote station 11, then the received power at the remote station 11 might be $P_{11}$. If the remote station 11 transmitted, at the first power level $P_1$ and at a second frequency $f_2$, where the second frequency $f_2$ is displaced from the first frequency $f_1$ by more than a correlation bandwidth, then the received power at the base station 12 might be $P_{12}$, which is statistically independent of the received power $P_{11}$ at the remote station 11. The statistical independence, or non-reciprocal nature of the terrestrial communications channels, is of major concern to users of a code-division-multiple-access (CDMA) system.

In a direct-sequence (DS) CDMA system, a remote station's spread-spectrum signal, received at a base station, is embedded in the interference caused by other users. Power control of the remote stations is therefore necessary for ensuring that during communications at the base station, the power level received from each remote station is approximately the same as from other remote stations communicating with the base station. Many elaborate systems exist for power control in a DS-CDMA system, where the base station determines the power levels of a received signal and interference, processes this information and periodically communicates to a remote station to increase or decrease its power level.

When a remote station is about to initiate its transmission, the remote station has little information as to what power level to transmit. Some investigators have suggested to use open-loop power control, in which the remote station monitors the power received from the base station transmitter at the first frequency $f_1$, and from the monitored power, the remote station sets its initial power level of its transmitter. The remote station, however, transmits at a second frequency $f_2$ which is not within the correlation bandwidth of the first frequency $f_1$. Since the communications channel at the first frequency $f_1$ is statistically independent from the communications channel at the second frequency $f_2$, the open-loop power control does not work, or does not work well.

Another approach to power control is to initiate transmitting a remote station at a low power level, and periodically increase the power level of the remote station until a signal is received at the base station. When the power level from the remote station is sufficient for the base station to receive, then the base station sends a response to the remote station to stop increasing the power level, unless otherwise signaled to do so. While this approach works, it takes considerable time delay, particularly if packet transmissions are employed. Thus, a ten millisecond packet might last five seconds.

SUMMARY OF THE INVENTION

A general object of the invention is to permit a remote station to have knowledge, a priori to transmitting, of a proper power level to initiate transmission.

Another object of the invention is to measure and initially correct or compensate for Doppler shift in carrier frequency caused by the motion of the remote station.

According to the present invention, as embodied and broadly described herein, an improvement is provided to a spread-spectrum system which has a base station (BS) and a plurality of remote stations (RS). The base station has a BS-spread-spectrum transmitter and a BS-spread-spectrum receiver. The BS-spread-spectrum transmitter transmits, using radio waves, a plurality of BS-spread-spectrum signals at a first frequency. The BS-spread-spectrum receiver receives, at a second frequency, a plurality of RS-spread-spectrum signals from the plurality of remote stations. The plurality of BS-spread-spectrum signals at the first frequency are outside the correlation bandwidth of the plurality of RS-spread-spectrum signals at the second frequency. Each of the plurality of remote stations has an RS-spread-spectrum transmitter for transmitting an RS-spread-spectrum signal at the second frequency.

The improvement includes a BS transmitter and an interference-reduction subsystem, located at the base station receiver. The BS transmitter transmits, using radio waves, a BS-channel-sounding signal at the second frequency. The BS-channel-sounding signal has a bandwidth no more than twenty per cent of the spread-spectrum bandwidth of the plurality of RS-spread-spectrum signals, and in a preferred embodiment, the BS-channel-sounding signal has a bandwidth no more than one percent of the spread-spectrum bandwidth of the plurality of RS-spread-spectrum signals.

At each remote station, the improvement includes an RS-power-level circuit and an RS receiver which has an RS demodulator. The improvement at the remote station also may include a frequency-adjust circuit. The RS receiver receives the BS-channel-sounding signal at the second frequency. The RS demodulator tracks the BS-channel-sounding signal, and outputs an RS-receiver signal. Using the receiver power level of the RS-receiver signal, the RS-power-level circuit adjusts an RS-power level of the RS-spread-spectrum transmitter located at the remote station. If the frequency-adjust circuit were employed, then the frequency-adjust circuit, using the received RS-receiver signal as a reference, compensates to the first frequency the RS-spread-spectrum signal of the RS-spread-spectrum transmitter located at the remote station.

The interference-reduction subsystem is located at the base station and at a front end to the BS-spread-spectrum receiver. The interference-reduction subsystem reduces, at the second frequency, the BS-channel-sounding signal from the plurality of RS-spread-spectrum signals arriving at the base station.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
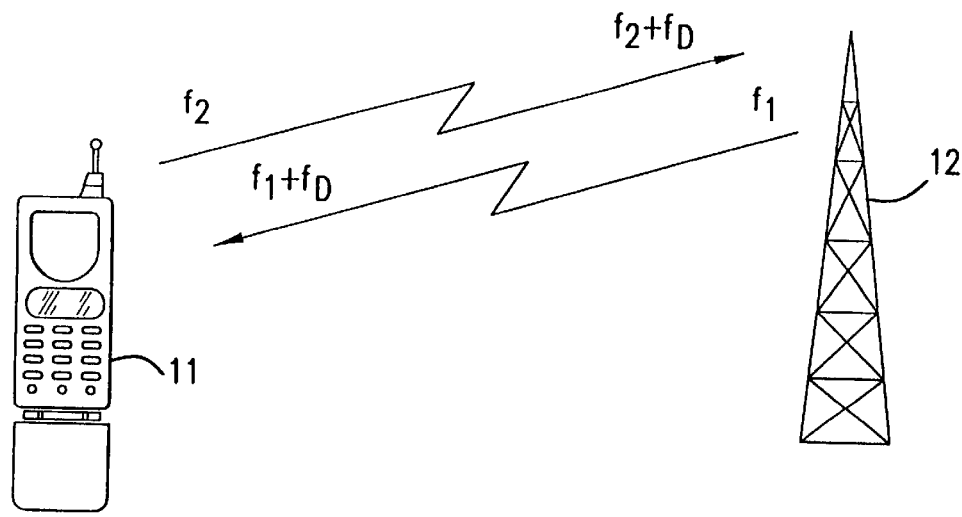
FIG. 1 illustrates a prior art remote station communicating with a base station (BS)

Reference now is made in detail to the present preferred embodiments of the invention, examples of which are illustrated in the accompanying drawings, wherein like reference numerals indicate like elements throughout the several views.

The instant invention disclosed herein provides a novel improvement and method to a spread-spectrum system, and more particularly to a cellular structure or environment with each cell containing a base station communicating with a plurality of remote stations, using spread-spectrum modulation. A remote station might be a hand-held unit or telephone, a connection to a computer or other modem, or other device which may be stationery or in motion.

The base station is assumed to transmit to the plurality of remote stations at a first frequency. A particular channel from the base station to a remote station is defined or determined by a particular chip-sequence signal, as is well known in the art for direct-sequence (DS) code-division-multiple access (CDMA) systems. The plurality of remote stations are assumed to transmit to the base station at a second carrier frequency. A particular channel from a particular remote station to the base station is defined or determined by a particular chip-sequence signal, as is well known in CDMA systems.

The invention overcomes a major problem with a plurality of remote stations transmitting to a common base station. The plurality of remote stations may be located at different distances, and each remote station may have a different propagation path, to the base station. Thus, even if all the remote stations transmitted with the same power lever, then the spread-spectrum signal from each remote station may arrive at the base station with a different power level. A strong power level from one remote station may cause sufficient interference to block or inhibit reception of the spread-spectrum signal from a more distant remote station. This power problem is commonly known as the "near-far" problem, or power control problem: How does the spread-spectrum system control the power transmitted from each remote station, so that the power received at the base station from each remote station is approximately the same? If the average power received at the base station is the same for each remote station, then the capacity is limited by the number of remote stations transmitting to the base station. If, however, a particular remote station is sufficiently close to the base station, and its transmitter power can block reception of other remote stations, then capacity may be limited severely to only the remote station closest to the base station.

The invention overcomes the power control problem by permitting a remote station to have knowledge, a priori to transmitting, of a proper power level to initiate transmission. After the initial power level is used, closed-loop power control, which is well-known in the art, can be employed.

An additional or alternative benefit from the invention is more accurate frequency control at a remote station. The carrier frequency transmitted from a remote station may be shifted at the base station due to Doppler shift in carrier frequency caused by motion. This invention initially corrects or compensates for Doppler shift in carrier frequency caused by the effective motion of the remote station. The remote station could be at a fixed location, and the Doppler shift in carrier frequency could be caused by time changes in the propagation path, such as trees blowing in the wind. After initial communications, a Costas loop or other frequency controlling circuit may be employed to control or compensate for frequency changes. Such devices or circuits are well-known in the art.

The invention broadly provides an improvement to a spread-spectrum system which has a base station (BS) and a plurality of remote stations (RS). The base station has a BS-spread-spectrum transmitter and a BS-spread-spectrum receiver. The BS-spread-spectrum transmitter transmits, using radio waves, a plurality of BS-spread-spectrum signals at a first frequency. The BS-spread-spectrum receiver receives, at a second frequency, as radio waves, a plurality of RS-spread-spectrum signals from the plurality of remote stations. The plurality of BS-spread-spectrum signals at the first frequency are outside the correlation bandwidth of the plurality of RS-spread-spectrum signals at the second frequency. Each of the plurality of remote stations has an RS-spread-spectrum transmitter for transmitting, as a radio wave, an RS-spread-spectrum signal at the second frequency.

At the base station, the improvement includes BS-transmitter means, and interference-reduction means. The BS-transmitter means transmits, as a radio wave, a BS-channel-sounding signal at the second frequency. The BS-channel-sounding signal has a bandwidth which is no more than twenty per cent of the spread-spectrum bandwidth of the plurality of RS-spread-spectrum signals, and preferably not more than one per cent of the spread-spectrum bandwidth.

The interference-reduction means is located at a front end to the BS-spread-spectrum receiver. The interference-reduction means reduces, by cancelling and notch filtering, at the second frequency, the BS-channel-sounding signal from the plurality of RS-spread-spectrum signals arriving at the base station.

While the BS-channel-sounding signal should have a bandwidth of no more than one per cent of the spread-spectrum bandwidth of the RS-spread-spectrum signal, system performance improves significantly as the bandwidth of the BS-channel-sounding signal decreases. Preferably, the BS-channel-sounding signal has a bandwidth of no more than one per cent, and should not exceed twenty per cent, of the spread-spectrum bandwidth of the RS-spread-spectrum signal. The BS-channel-sounding signal may be a continuous wave signal, also known as a carrier signal. Alternatively, the BS-channel-sounding signal may be modulated with amplitude modulation (AM), frequency modulation (FM), phase modulation (PM), or a combination thereof. Amplitude-shift-keying (ASK) modulation, frequency-shift-keying (FSK) modulation or phase-shift-keying (PSK) modulation may be employed. Similarly, a narrowband spread-spectrum signal could modulate the BS-channel-sounding signal. A combination of these modulations also could be employed. The modulation in the BS-channel-sounding signal can be used for base station identification, as well as for other information such as commercials, stock quotes, etc.

The bandwidth of the BS-channel-sounding signal is a determinative factor, and a design choice, since increased bandwidth will cause increased interference to the plurality of RS-spread-spectrum signals, which are at the same frequency as the BS-channel-sounding signal. At a one per cent bandwidth of the plurality of RS-spread-spectrum signals, little degradation in system performance results.

Each of the plurality of remote stations includes RS-receiver means, RS-power means and compensating means. The RS-receiving means receives the BS-channel-sounding signal at the second frequency, and demodulates the BS-channel-sounding signal, and outputs an RS-receiver signal. RS-power-level means, in response to the received power level of the BS-channel-sounding signal, adjusts an initial RS-power level of the RS-spread-spectrum transmitter located at the remote station. In response to the RS-receiver signal, the compensating means compensates the second frequency, for Doppler shift, of the RS-spread-spectrum signal of the RS-spread-spectrum transmitter located at the remote station. For example, if the carrier frequency of the received BS-channel-sounding signal had a negative Doppler shift from its carrier frequency, as received at the remote station, then the compensating means would impose a positive shift from the designated carrier frequency on the transmitted RA-spread-spectrum signal. Due to motion of the remote station or propagation path motions in the communications channel, the RS-spread-spectrum signal arrives at the base station at the corrected carrier frequency, i.e., at the second frequency. In a preferred embodiment, the RS-power means is employed to initially set the transmitter power of the remote station. The compensating means may also be used to correct the transmitter frequency of the RS-spread-spectrum transmitter.

Figure 2:
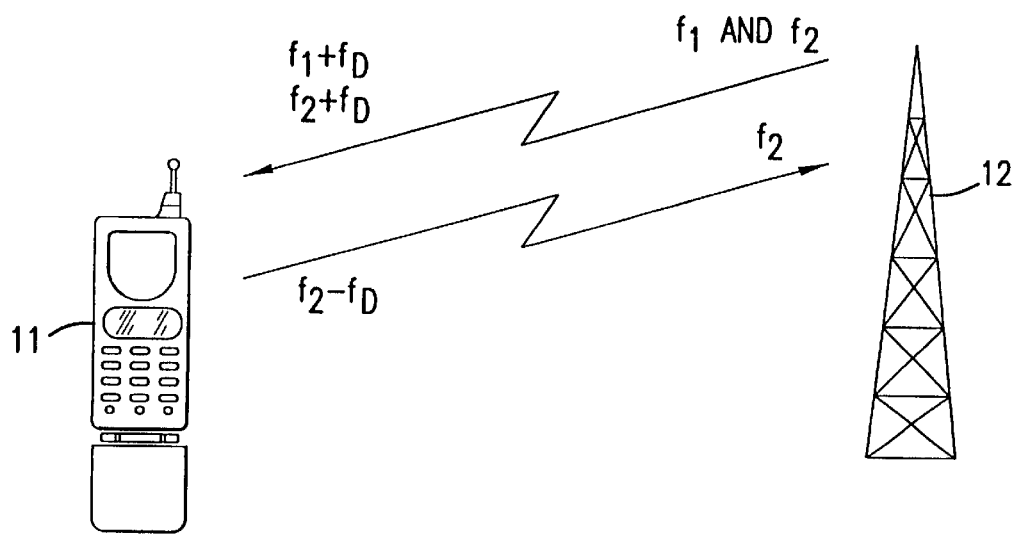
FIG. 2 illustrates a remote station communicating with a base station, with channel sounding.

In the exemplary arrangement shown in FIG. 2, the base station 12 is shown communicating, using radio waves, with a remote station with frequency compensation. Since the BS-channel-sounding signal is transmitted, as a radio wave, from the base station 12 at the second frequency $f_2$ to the remote station 11, and the remote station 11 knows at what frequency the BS-channel-sounding signal is suppose to be received, then remote station 11 can determine the Doppler frequency shift $f_D$ and compensate its transmitter frequency by a similar amount so that the RS-spread-spectrum signal arrives at the base station 12 with a carrier frequency at the correct second frequency $f_2$. Thus, the RS-spread-spectrum signal is detected at the base station at the second frequency $f_2$, without a Doppler shift in carrier frequency $f_D$. If motion of the remote station caused a positive shift in the Doppler frequency $f_D$, then the correct compensation would be to subtract the Doppler shift in carrier frequency $f_D$ and transmit at frequency $f_2-f_D$. The remote station 11 also can measure the power level of the BS-channel-sounding signal, and from this measurement, set its initial power level for transmitting the RS-spread-spectrum signal at frequency $f_2$.

Figure 3:
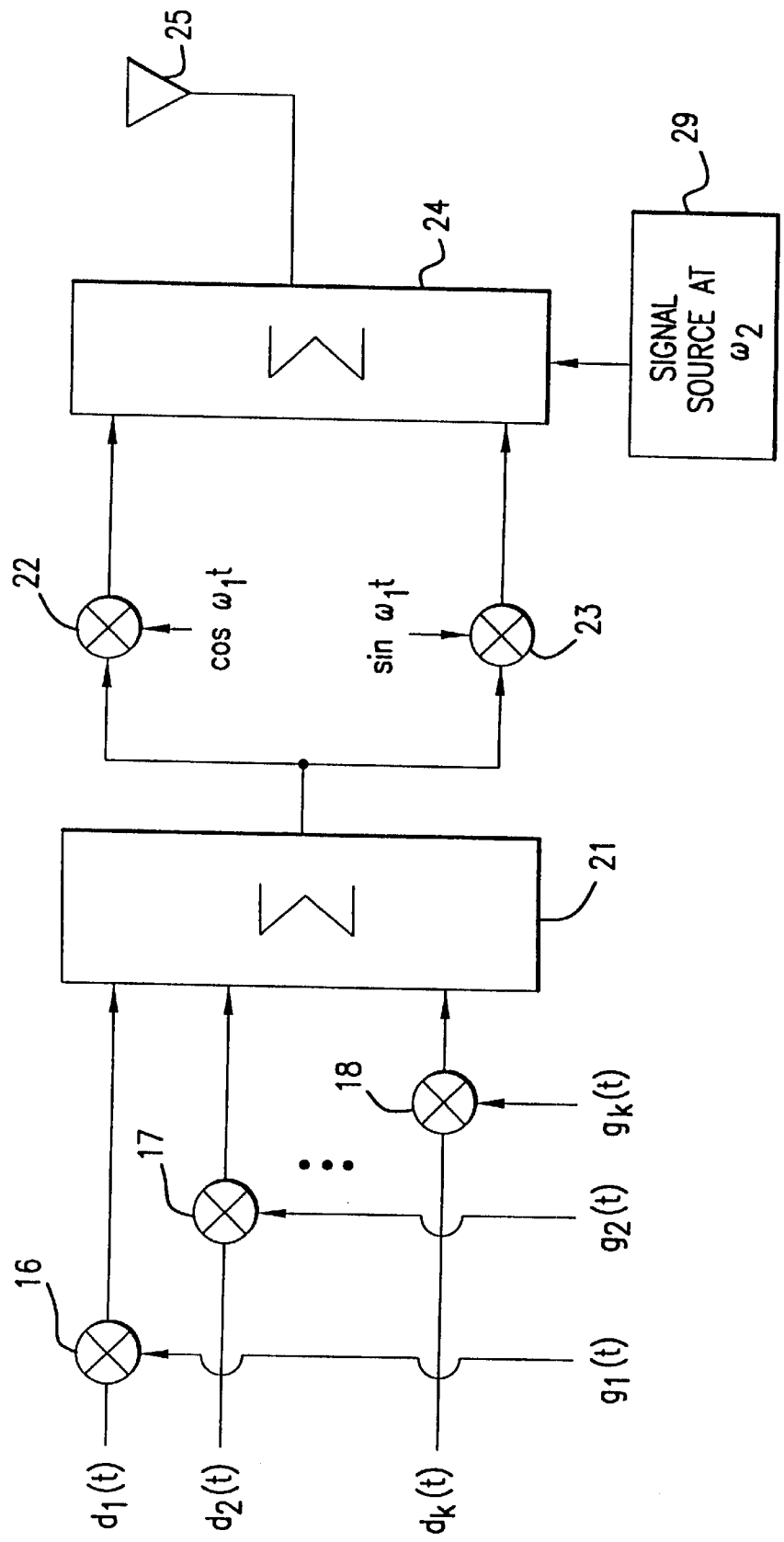
FIG. 3 is a block diagram illustrating a base station signal with channel sounding added to a base station spread-spectrum transmitter.

In FIG. 3, the improvement to the BS-spread-spectrum transmitter is shown. The signal source 29 generates the BS-channel-sounding signal. The BS-channel-sounding signal is combined in combiner 24 with the BS-spread-spectrum signal. The BS-spread-spectrum signal may be generated, as is well known in the art, by a plurality of product devices 16, 17, 18, which multiply a plurality of data signals $d_1(t), d_2(t), \ldots d_k(t)$, by a plurality of chip-sequence signals $g_1(t), g_2(t), g_k(t)$. The outputs from the plurality of product devices 16, 17, 18 is a plurality of spread-data signals. Typically, the plurality of spread-data signals is combined linearly by a combiner 21, to generate a combined-spread-data signal. The combined-spread-data signal is multiplied by in-phase product device 22 by a cosine signal at the first frequency $f_1$, and by a quadrature-phase product device 23 by a sine signal at the first frequency $f_1$, to generate in-phase and quadrature-phase components of the BS-spread-spectrum signal. The in-phase component of the BS-spread-spectrum signal and the quadrature-phase component of the BS-spread-spectrum signal are then combined to make the BS-spread-spectrum signal which is transmitted from the base station 12 at the first frequency, by antenna 25. Techniques for generating spread-spectrum signals are well known in the art, and the technique shown in FIG. 3 is only representative.

The design of spread-spectrum transmitters is well-known in the art. Typically, the BS-spread-spectrum transmitter would be implemented in a digital signature processor (DSP) or application specific integrated circuit (ASIC). Alternative techniques for building a spread-spectrum transmitter include using a digital matched filter, with the matched filter having an impulse response mated to the specific chip-sequence signal desired for a spread-spectrum channel. Alternatively, surface acoustic wave (SAW) devices can be used as a matched filter. Further, the plurality of chip-sequence signals can be stored in a memory, and each time a particular digital signal is applied to a memory address, and particular chip-sequence signal is outputted to the combiner 21. All these techniques, and others, are well known in the art for generating spread-spectrum signals.

The signal source 29 generates the BS-channel-sounding signal, which may be a simple continuous wave signal, or a signal modulated with AM modulation, FM modulation, PM modulation, ASK modulation, FSK modulation, PSK modulation or spread-spectrum modulation. With modulation, the BS-channel-sounding signal can carry data, such as signaling data or order wire data. Alternatively, the BS-channel-sounding signal can broadcast to the plurality of remote stations general information such as timing, advertisements or commercials, and other information to update the remote station from the base station.

Figure 4:
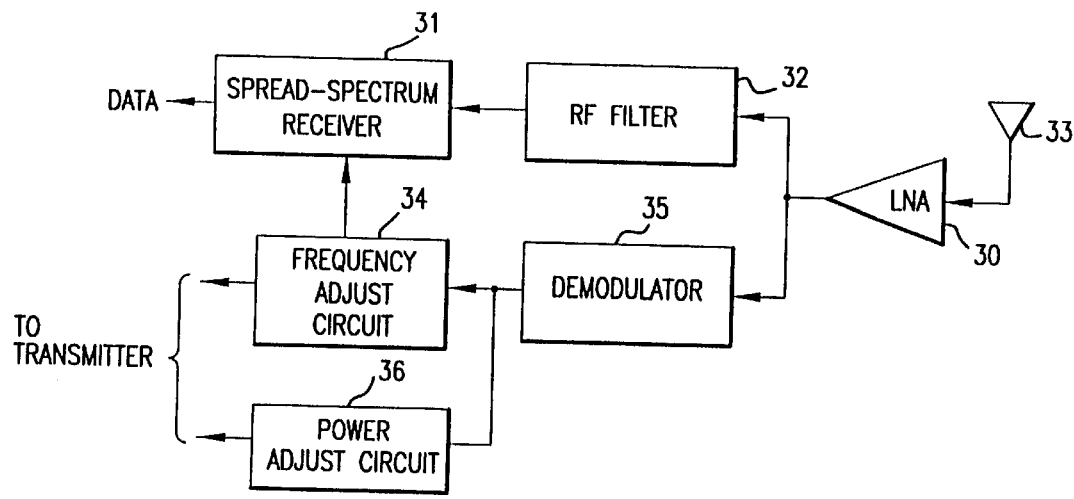
FIG. 4 is a block diagram illustrating the improvement to the remote station spread-spectrum receiver for the BS-channel-sounding signal.

FIG. 4 illustratively shows the improvement to the remote station receiver. The RS-spread-spectrum receiver includes the spread-spectrum receiver 31, the RF filter 32, and the low noise amplifier (LNA) 30, coupled to the antenna 33. The RF filter 32 is coupled between the spread-spectrum receiver 21 and the low noise amplifier 30. The components for the RS-spread-spectrum receiver are well known in the art. For example, the RS-spread-spectrum receiver may be embodied as a plurality of product devices and a chip-signal generator, with output lowpass or bandpass filters. The operation of multiplying a received spread-spectrum signal by a plurality of chip-sequence signals is well known, and can be found in many textbooks on the subject. Alternatively, the RS-spread-spectrum receiver may be embodied as a plurality of matched filters, which have a plurality of impulse responses matched to the plurality of chip-sequence signals embedded in the received BS-spread-spectrum signal. The RS-spread-spectrum receiver may be implemented as an integrated circuit, ASIC, SAW device, and may operate at baseband, intermediate frequency or other processing frequency.

The improvement includes RS-receiver means, which is embodied as demodulator 35. The demodulator 35 is coupled to low noise amplifier 30, for receiving the BS-channel-sounding signal at the second frequency $f_2$, or at the second frequency plus or minus a Doppler shift $f_d$ in carrier frequency from the second frequency $f_2$. The demodulator 35 may include a tracking filter, phase-locked-loop (PLL) circuit, FM or PM discriminator, spread-spectrum receiver, or other circuitry for demodulating the BS-channel-sounding signal. The demodulator 35 demodulates the BS-channel-sounding signal, and outputs an RS-receiver signal. The RS-receiver signal is a demodulated version of the received BS-channel-sounding signal, and may include a power level proportional to a received power level of the BS-channel-sounding signal, and a frequency representation or shift, of the received BS-channel-sounding signal.

The compensating means is embodied as a frequency-adjust circuit 34, coupled to the RS demodulator 35. In response to the RS-receiver signal, the frequency-adjust circuit 34 compensates to the first frequency the RS-spread-spectrum signal of the RS-spread-spectrum transmitter located at the remote station. The frequency-adjust circuit 34 also can provide Doppler information, including Doppler shift in carrier frequency $f_D$, by way of a Doppler signal to the spread-spectrum receiver 31. The frequency-adjust circuit 34 might include a local oscillator or other signal source, and a comparator circuit. The local oscillator or signal source from the RS-spread-spectrum transmitter generates a local signal at the second frequency $f_2$. The comparator compares the local signal with the received BS-channel-sounding signal, or the RS-receiver signal, to determine Doppler shift in carrier frequency $f_D$. A signal with the Doppler shift in carrier frequency can be used to adjust the transmitter frequency of the RS-spread-spectrum signal. Electronic circuits for the comparator and frequency adjust circuit 34, are well known in the art. The spread-spectrum receiver can adjust its oscillator circuit, or the frequency-adjust circuit 34 can adjust the frequency of the oscillator for the spread-spectrum receiver 31, thereby compensating for Doppler shift in carrier frequency $f_D$ due to motion.

Figure 5:
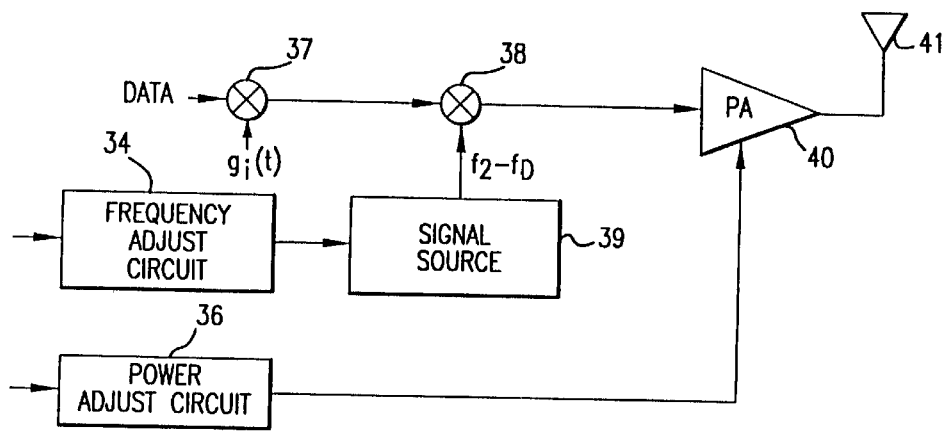
FIG. 5 is a block diagram illustrating the improvement to the remote station spread-spectrum transmitter.

The RS-power means may be embodied as a power-adjust circuit 36, which is coupled to the output of the demodulator 35. As shown in FIG. 5, the power-adjust circuit 36 couples to a variable power amplifier 40 of the RS-spread-spectrum transmitter. Depending on the power level from the BS-channel-sounding signal, or RS-receiver signal, the power-adjust circuit 36 can adjust the output power of the variable power amplifier 40 to a desired level. An equivalent circuit for the variable power amplifier 40 would be a variable attenuator, which attenuates in response to a power-adjust signal.

Similarly, the frequency-adjust circuit 34 may couple to the signal source 39 of the RS-spread-spectrum transmitter. The frequency-adjust circuit 34 can offset the transmitter frequency by the Doppler frequency $f_D$, so that the RS-spread-spectrum signal arrives at the base station 12 at the correct second frequency $f_2$. By subtracting the Doppler frequency $f_D$ from the second frequency $f_2$, the transmitter frequency of the RS-spread-spectrum signal shifts back to the second frequency $f_2$ due to the Doppler frequency added to the carrier frequency of the RS-spread-spectrum signal, due to motion of the remote station.

In FIG. 5, the RS-spread-spectrum transmitter includes a product device 37 for multiplying a chip-sequence signal by data to generate a spread-data signal. For a positive Doppler shift in carrier frequency of the BS-channel-sounding signal, the spread-data signal is shifted to a carrier frequency of $f_2-f_D$, by product device 38, to generate the RS-spread-spectrum signal. For a negative Doppler shift in carrier frequency of the BS-channel-sounding signal, the spread-data signal is shifted to a carrier frequency of $f_2+f_D$, by product device 38, to generate the RS-spread-spectrum signal. The RS-spread-spectrum signal is amplified by amplifier 40 and radiated by antenna 41.

Figure 6:
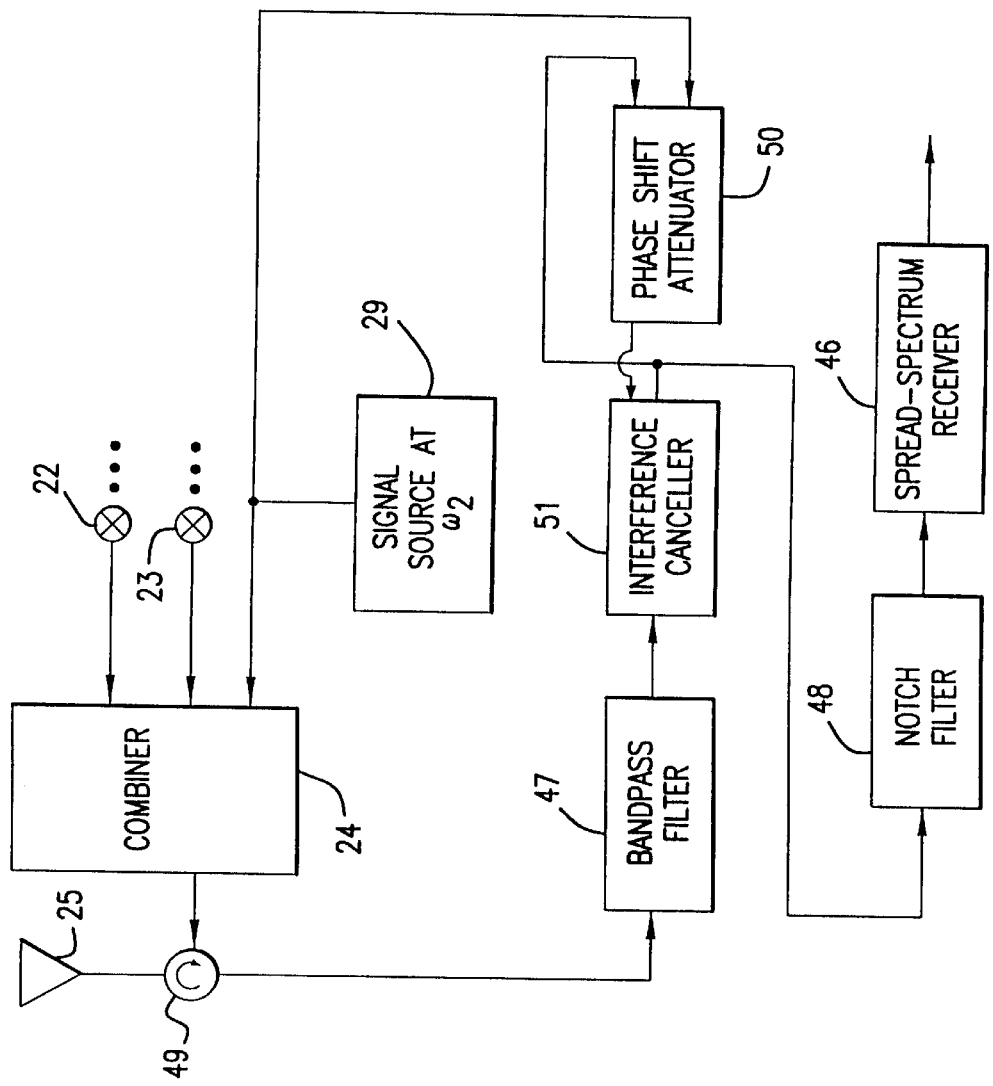
FIG. 6 is a block diagram showing an interference-reduction subsystem at a front end to a base station spread-spectrum receiver.

FIG. 6 shows the improvement to the BS receiver. The BS transmitter 24 is connected to a coupler 49, such as a circulator, which connects to the antenna 25. The antenna 25 is used in FIG. 6 for transmitting and receiving at the frequency $f_2$. The RS-spread-spectrum signals received from the remote stations pass through the coupler 49, through the bandpass filter 47 and in to the interference canceller 51. The BS-channel-sounding signal from the signal source 29 passes in to the phase-shift attenuator 50. An output of interference canceller 51 is coupled to an input of the phase-shift attenuator 50. The signal from the interference canceller 51 adjusts the phase-shift attenuator 50 so as to minimize the BS-channel-sounding signal level fed in to the base station spread-spectrum receiver 46.

As an option, a notch filter 48 may be coupled between the interference canceller 51 and the base station spread-spectrum receiver 46. The notch filter 48 notch filters the interference from the BS-channel-sounding signal. An interference canceller 51 with a phase-shift attenuator 50 for reducing interference, in general, is well known in the art. The interference canceller 51 and the phase-shift attenuator 50 operate in a feedback loop so as to minimize the effect of a received signal at the second frequency $f_2$ by effectively feeding a signal from signal source at the second frequency $f_2$, 180° out of phase with the received signal.

Figure 7:
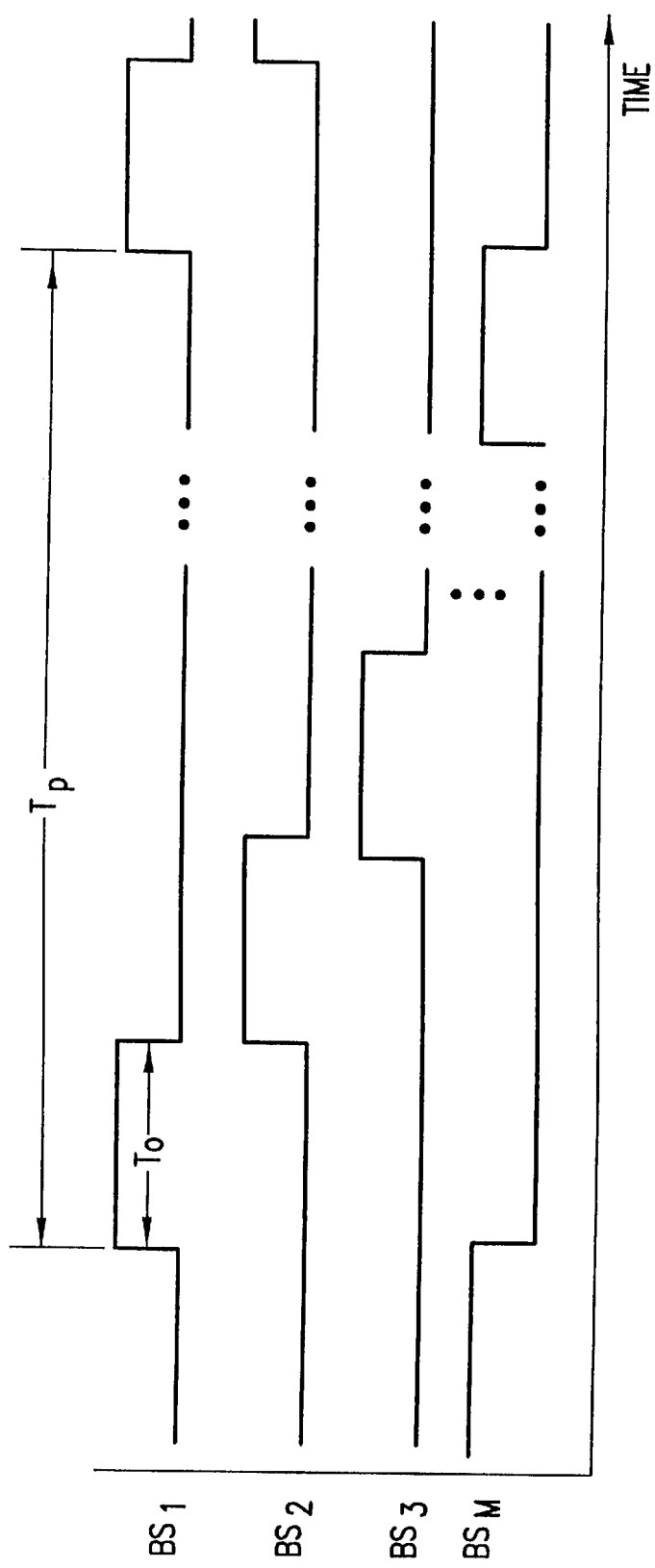
FIG. 7 is a timing diagram of how several base stations might transmit the BS-channel-sounding signal.

The present invention may be used in a cellular architecture having a plurality of base stations. The BS-channel-sounding signal may be modulated to identify a particular base station. Thus, a remote station knows with which cell it is in communication by the modulation on the BS-channel-sounding signal. An alternative may have a plurality of base stations, which cover a large geographic area, transmit their respective BS-channel-sounding signal in a respective time slot, as shown in FIG. 7. During a particular time slot, a packet may be transmitted by the respective base station. The packet may include no information, or identifying information. From the packet, a remote station can determine relative power, and Doppler shift in carrier frequency $f_D$, of the particular base station to the remote unit.

The present invention also includes a method for improving a spread-spectrum system. The spread-spectrum system has at least one base station and a plurality of remote stations (RS). The base station (BS) has a BS-spread-spectrum transmitter for transmitting, as radio waves, a plurality of BS-spread-spectrum signals at a first frequency. The base station also has a BS-spread-spectrum receiver for receiving, at a second frequency, a plurality of RS-spread-spectrum signals from the plurality of remote stations. The plurality of BS-spread-spectrum signals are assumed to be at the first frequency outside a correlation bandwidth of the plurality of RS-spread-spectrum signals at the second frequency. Each of the plurality of remote stations has an RS-spread-spectrum transmitter for transmitting an RS-spread-spectrum signal at the second frequency. The method comprises the steps of transmitting, from a BS transmitter, located at the base station, a BS-channel-sounding signal at the second frequency. The BS-channel-sounding signal has a bandwidth no more than twenty per cent of the spread-spectrum bandwidth of the plurality of RS-spread-spectrum signals, and preferably less than one percent of the spread-spectrum bandwidth of the plurality of RS-spread-spectrum signals. The method includes receiving, at each of the plurality of remote stations with an RS receiver, the BS-channel-sounding signal at the second frequency, and receiving, at each of the plurality of remote stations with an RS demodulator, a the BS-channel-sounding signal. The RS demodulator outputs an RS-receiver signal. The method further includes the step of compensating, in response to the RS-receiver signal, a frequency-adjust circuit to the first frequency the RS-spread-spectrum signal of the RS-spread-spectrum transmitter located at the remote station. The method may adjust, in response to the RS-receiver signal, an initial RS-power level of the RS-spread-spectrum transmitter located at the remote station. At the base station, the method includes the step of reducing, at the second frequency, the BS-channel-sounding signal from the RS-spread-spectrum signal arriving at the base station.

The method optionally may further include the step of compensating, in response to RS-receiver signal, to the first frequency the RS-spread-spectrum signal of the RS-spread-spectrum transmitter located at the remote station.

It will be apparent to those skilled in the art that various modifications can be made to the spread-spectrum channel sounding improvement of the instant invention without departing from the scope or spirit of the invention, and it is intended that the present invention cover modifications and variations of the spread-spectrum channel sounding improvement provided they come within the scope of the appended claims and their equivalents.

I claim:

1. An improvement to a spread-spectrum system having a base station and a plurality of remote stations (RS), with said base station (BS) having a BS-spread-spectrum transmitter for transmitting a plurality of BS-spread-spectrum signals at a first frequency and a BS-spread-spectrum receiver for receiving, at a second frequency, a plurality of RS-spread-spectrum signals from said plurality of remote stations, with the plurality of BS-spread-spectrum signals at the first frequency outside a correlation bandwidth of the plurality of RS-spread-spectrum signals at the second frequency, with each of said plurality of remote stations having an RS-spread-spectrum transmitter for transmitting an RS-spread-spectrum signal at the second frequency, the improvement comprising:

a BS transmitter, located at said base station, for transmitting a BS-channel-sounding signal at the second frequency, with the BS-channel-sounding signal having a bandwidth no more than twenty per cent of the spread-spectrum bandwidth of the plurality of RS-spread-spectrum signals;

each of said plurality of remote stations including an RS receiver, for receiving the BS-channel-sounding signal at the second frequency, each RS receiver having, an RS demodulator for tracking the BS-channel-sounding signal, thereby outputting an RS-receiver signal;

a frequency-adjust circuit, coupled to said RS demodulator and responsive to the RS-receiver signal, for compensating to the second frequency the RS-spread-spectrum signal of said RS-spread-spectrum transmitter located at said remote station;

each of said plurality of remote stations including an RS-power-level circuit, responsive to the RS-receiver signal, for adjusting an initial RS-power level of said RS-spread-spectrum transmitter located at said remote station; and an interference-reduction subsystem, located at said base station and at a front end to said BS-spread-spectrum receiver, for reducing, at the second frequency, the BS-channel-sounding signal from the RS-spread-spectrum signal arriving at said base station.

2. An improvement to a spread-spectrum system having a base station and a plurality of remote stations (RS), with said base station (BS) having a BS-spread-spectrum transmitter for transmitting a plurality of BS-spread-spectrum signals at a first frequency and a BS-spread-spectrum receiver for receiving, at a second frequency, a plurality of RS-spread-spectrum signals from said plurality of remote stations, with the plurality of BS-spread-spectrum signals at the first frequency outside a correlation bandwidth of the plurality of RS-spread-spectrum signals at the second frequency, with each of said plurality of remote stations having an RS-spread-spectrum transmitter for transmitting an RS-spread-spectrum signal at the second frequency, the improvement comprising:

a BS transmitter, located at said base station, for transmitting, using radio waves, a BS-channel-sounding signal at the second frequency, with the BS-channel-sounding signal having a bandwidth no more than twenty per cent of the spread-spectrum bandwidth of the plurality of RS-spread-spectrum signals;

each of said plurality of remote stations including an RS receiver, for receiving the BS-channel-sounding signal at the second frequency, each RS receiver having an RS demodulator for tracking the BS-channel-sounding signal, thereby outputting an RS-receiver signal;

each of said plurality of remote stations including an RS-power-level circuit, responsive to the RS-receiver signal, for adjusting an initial RS-power level of said RS-spread-spectrum transmitter located at said remote station; and an interference-reduction subsystem, located at said base station and at a front end to said BS-spread-spectrum receiver, for reducing the BS-channel-sounding signal from the RS-spread-spectrum signal arriving at said base station.

3. An improvement to a spread-spectrum system having a base station and a plurality of remote stations (RS), with said base station (BS) having a BS-spread-spectrum transmitter for transmitting a plurality of BS-spread-spectrum signals at a first frequency and a BS-spread-spectrum receiver for receiving, at a second frequency, a plurality of RS-spread-spectrum signals from said plurality of remote stations, with the plurality of BS-spread-spectrum signals at the first frequency outside a correlation bandwidth of the plurality of RS-spread-spectrum signals at the second frequency, with each of said plurality of remote stations having an RS-spread-spectrum transmitter for transmitting an RS-spread-spectrum signal at the second frequency, the improvement comprising:

a BS transmitter, located at said base station, for transmitting, using radio waves, a BS-channel-sounding signal at the second frequency, with the BS-channel-sounding signal having a bandwidth no more than twenty per cent of the spread-spectrum bandwidth of the plurality of RS-spread-spectrum signals;

each of said plurality of remote stations including an RS receiver, for receiving the BS-channel-sounding signal at the second frequency, each RS receiver having, an RS demodulator for tracking the BS-channel-sounding signal, thereby outputting an RS-receiver signal;

a frequency-adjust circuit, coupled to said RS demodulator and responsive to the RS-receiver signal, for compensating to the second frequency the RS-spread-spectrum signal of said RS-spread-spectrum transmitter located at said remote station; and an interference-reduction subsystem, located at said base station and at a front end to said BS-spread-spectrum receiver, for reducing the BS-channel-sounding signal from the RS-spread-spectrum signal arriving at said base station.

4. The improvement to the spread-spectrum system as set forth in claim 1, 2 or 3, with said BS transmitter transmitting the BS-channel-sounding signal at the second frequency, with the BS-channel-sounding signal having a bandwidth no more than ten per cent of the spread-spectrum bandwidth of the plurality of RS-spread-spectrum signals.

5. The improvement to the spread-spectrum system as set forth in claim 1, 2 or 3, with said BS transmitter transmitting the BS-channel-sounding signal at the second frequency, with the BS-channel-sounding signal having a bandwidth no more than five per cent of the spread-spectrum bandwidth of the plurality of RS-spread-spectrum signals.

6. The improvement to the spread-spectrum system as set forth in claim 1, 2 or 3, with said BS transmitter transmitting the BS-channel-sounding signal at the second frequency, with the BS-channel-sounding signal having a bandwidth no more than one per cent of the spread-spectrum bandwidth of the plurality of RS-spread-spectrum signals.

7. An improvement to a spread-spectrum system having a base station and a plurality of remote stations (RS), with said base station (BS) having a BS-spread-spectrum transmitter for transmitting a plurality of BS-spread-spectrum signals at a first frequency and a BS-spread-spectrum receiver for receiving, at a second frequency, a plurality of RS-spread-spectrum signals from said plurality of remote stations, with the plurality of BS-spread-spectrum signals at the first frequency outside a correlation bandwidth of the plurality of RS-spread-spectrum signals at the second frequency, with each of said plurality of remote stations having an RS-spread-spectrum transmitter for transmitting an RS-spread-spectrum signal at the second frequency, the improvement comprising:

BS-transmitter means, located at said base station, for transmitting, using radio waves, a BS-channel-sounding signal at the second frequency, with the BS-channel-sounding signal having a bandwidth no more than twenty per cent of the spread-spectrum bandwidth of the plurality of RS-spread-spectrum signals;

each of said plurality of remote stations including RS-receiver means, for receiving the BS-channel-sounding signal at the second frequency, and for tracking the BS-channel-sounding signal, thereby outputting an RS-receiver signal;

each of said plurality of remote stations including RS-power-level means, responsive to the RS-receiver signal, for adjusting an initial RS-power level of said RS-spread-spectrum transmitter located at said remote station; and interference-reduction means, located at said base station and at a front end to said BS-spread-spectrum receiver, for reducing the BS-channel-sounding signal from the RS-spread-spectrum signal arriving at said base station.

8. The improvement to the spread-spectrum system as set forth in claim 7, with said RS-receiver means at each of said plurality of remote stations further including compensating means, responsive to RS-receiver signal, for compensating to the second frequency the RS-spread-spectrum signal of said RS-spread-spectrum transmitter located at said remote station.

9. The improvement to the spread-spectrum system as set forth in claim 7 or 8, with said BS transmitter transmitting the BS-channel-sounding signal at the second frequency, with the BS-channel-sounding signal having a bandwidth no more than ten per cent of the spread-spectrum bandwidth of the plurality of RS-spread-spectrum signals.

10. The improvement to the spread-spectrum system as set forth in claim 7 or 8, with said BS transmitter transmitting the BS-channel-sounding signal at the second frequency, with the BS-channel-sounding signal having a bandwidth no more than five per cent of the spread-spectrum bandwidth of the plurality of RS-spread-spectrum signals.

11. The improvement to the spread-spectrum system as set forth in claim 7 or 8, with said BS transmitter transmitting the BS-channel-sounding signal at the second frequency, with the BS-channel-sounding signal having a bandwidth no more than one per cent of the spread-spectrum bandwidth of the plurality of RS-spread-spectrum signals.

12. A method for improving a spread-spectrum system having a base station and a plurality of remote stations (RS), with said base station (BS) having a BS-spread-spectrum transmitter for transmitting a plurality of BS-spread-spectrum signals at a first frequency and a BS-spread-spectrum receiver for receiving, at a second frequency, a plurality of RS-spread-spectrum signals from said plurality of remote stations, with the plurality of BS-spread-spectrum signals at the first frequency outside a correlation bandwidth of the plurality of RS-spread-spectrum signals at the second frequency, with each of said plurality of remote stations having an RS-spread-spectrum transmitter for transmitting an RS-spread-spectrum signal at the second frequency, the method comprising the steps of:

transmitting, using radio waves, from a BS transmitter, located at said base station, a BS-channel-sounding signal at the second frequency, with the BS-channel-sounding signal having a bandwidth no more than twenty per cent of the spread-spectrum bandwidth of the plurality of RS-spread-spectrum signals;

receiving, at each of said plurality of remote stations with an RS receiver, the BS-channel-sounding signal at the second frequency;

tracking, at each of said plurality of remote stations with an RS demodulator, a the BS-channel-sounding signal, thereby generating an RS-receiver signal;

adjusting, in response to the RS-receiver signal, an initial RS-power level of said RS-spread-spectrum transmitter located at said remote station; and reducing the BS-channel-sounding signal from the RS-spread-spectrum signal arriving at said base station.

13. The method for improving the spread-spectrum system as set forth in claim 12, further including the step of compensating, in response to RS-receiver signal, to the second frequency the RS-spread-spectrum signal of said RS-spread-spectrum transmitter located at said remote station.

14. The method for improving the spread-spectrum system as set forth in claim 12 or 13, with the step of transmitting the BS-channel-sounding signal at the second frequency, including the step of transmitting the BS-channel-sounding signal with a bandwidth no more than ten per cent of the spread-spectrum bandwidth of the plurality of RS-spread-spectrum signals.

15. The method for improving the spread-spectrum system as set forth in claim 12 or 13, with the step of transmitting the BS-channel-sounding signal at the second frequency, including the step of transmitting the BS-channel-sounding signal with a bandwidth no more than one per cent of the spread-spectrum bandwidth of the plurality of RS-spread-spectrum signals.

16. The method for improving the spread-spectrum system as set forth in claim 12 or 13, with the step of transmitting the BS-channel-sounding signal at the second frequency, including the step of transmitting the BS-channel-sounding signal with a bandwidth no more than one per cent of the spread-spectrum bandwidth of the plurality of RS-spread-spectrum signals.

17. The method for improving the spread-spectrum system as set forth in claim 12 or 13, with the step of reducing the BS-channel-sounding signal further including the step of notch filtering the BS-channel-sounding signal from the plurality of RS-spread-spectrum signals.

18. The method for improving the spread-spectrum system as set forth in claim 14, with the step of reducing the BS-channel-sounding signal further including the step of notch filtering the BS-channel-sounding signal from the plurality of RS-spread-spectrum signals.

19. The method for improving the spread-spectrum system as set forth in claim 15, with the step of reducing the BS-channel-sounding signal further including the step of notch filtering the BS-channel-sounding signal from the plurality of RS-spread-spectrum signals.

20. The method for improving the spread-spectrum system as set forth in claim 16, with the step of reducing the BS-channel-sounding signal further including the step of notch filtering the BS-channel-sounding signal from the plurality of RS-spread-spectrum signals.

21. An improvement to a spread-spectrum system having a plurality of base stations covering a geographic area, with each base station communicating within a geographic cell with a plurality of remote stations (RS), with each base station (BS) having a BS-spread-spectrum transmitter for transmitting a plurality of BS-spread-spectrum signals at a first frequency and a BS-spread-spectrum receiver for receiving, at a second frequency, a plurality of RS-spread-spectrum signals from said plurality of remote stations, with the plurality of BS-spread-spectrum signals at the first frequency outside a correlation bandwidth of the plurality of RS-spread-spectrum signals at the second frequency, with each of said plurality of remote stations having an RS-spread-spectrum transmitter for transmitting an RS-spread-spectrum signal at the second frequency, the improvement comprising:

a BS transmitter, located at each base station, for transmitting a BS-channel-sounding signal at the second frequency, with the BS-channel-sounding signal transmitted within a respective time slot assigned to the respective BS transmitter, and having a bandwidth no more than twenty per cent of the spread-spectrum bandwidth of the plurality of RS-spread-spectrum signals;

each of said plurality of remote stations including an RS receiver, for receiving the BS-channel-sounding signal at the second frequency, each RS receiver having,
  an RS demodulator for tracking the BS-channel-sounding signal, thereby outputting an RS-receiver signal;
  a frequency-adjust circuit, coupled to said RS demodulator and responsive to the RS-receiver signal, for compensating to the second frequency the RS-spread-spectrum signal of said RS-spread-spectrum transmitter located at said remote station;

each of said plurality of remote stations including an RS-power-level circuit, responsive to the RS-receiver signal, for adjusting an initial RS-power level of said RS-spread-spectrum transmitter located at said remote station; and an interference-reduction subsystem, located at said base station and at a front end to said BS-spread-spectrum receiver, for reducing, at the second frequency, the BS-channel-sounding signal from the RS-spread-spectrum signal arriving at said base station.

22. An improvement to a spread-spectrum system having a plurality of base stations covering a geographic area, with each base station communicating within a geographic cell with a plurality of remote stations (RS), with each base station (BS) having a BS-spread-spectrum transmitter for transmitting a plurality of BS-spread-spectrum signals at a first frequency and a BS-spread-spectrum receiver for receiving, at a second frequency, a plurality of RS-spread-spectrum signals from said plurality of remote stations, with the plurality of BS-spread-spectrum signals at the first frequency outside a correlation bandwidth of the plurality of RS-spread-spectrum signals at the second frequency, with each of said plurality of remote stations having an RS-spread-spectrum transmitter for transmitting an RS-spread-spectrum signal at the second frequency, the improvement comprising:

a BS transmitter, located at each base station, for transmitting a BS-channel-sounding signal at the second frequency, with the BS-channel-sounding signal transmitted within a respective time slot assigned to the respective BS transmitter, and having a bandwidth no more than twenty per cent of the spread-spectrum bandwidth of the plurality of RS-spread-spectrum signals;

each of said plurality of remote stations including an RS receiver, for receiving the BS-channel-sounding signal at the second frequency, each RS receiver having an RS demodulator for tracking the BS-channel-sounding signal, thereby outputting an RS-receiver signal;

each of said plurality of remote stations including an RS-power-level circuit, responsive to the RS-receiver signal, for adjusting an initial RS-power level of said RS-spread-spectrum transmitter located at said remote station; and an interference-reduction subsystem, located at said base station and at a front end to said BS-spread-spectrum receiver, for reducing, at the second frequency, the BS-channel-sounding signal from the RS-spread-spectrum signal arriving at said base station.

23. An improvement to a spread-spectrum system having a plurality of base stations covering a geographic area, with each base station communicating within a geographic cell with a plurality of remote stations (RS), with each base station (BS) having a BS-spread-spectrum transmitter for transmitting a plurality of BS-spread-spectrum signals at a first frequency and a BS-spread-spectrum receiver for receiving, at a second frequency, a plurality of RS-spread-spectrum signals from said plurality of remote stations, with the plurality of BS-spread-spectrum signals at the first frequency outside a correlation bandwidth of the plurality of RS-spread-spectrum signals at the second frequency, with each of said plurality of remote stations having an RS-spread-spectrum transmitter for transmitting an RS-spread-spectrum signal at the second frequency, the improvement comprising:

a BS transmitter, located at each base station, for transmitting a BS-channel-sounding signal at the second frequency, with the BS-channel-sounding signal transmitted within a respective time slot assigned to the respective BS transmitter, and having a bandwidth no more than twenty per cent of the spread-spectrum bandwidth of the plurality of RS-spread-spectrum signals;

each of said plurality of remote stations including an RS receiver, for receiving the BS-channel-sounding signal at the second frequency, each RS receiver having,
- an RS demodulator for tracking the BS-channel-sounding signal, thereby outputting an RS-receiver signal;
- a frequency-adjust circuit, coupled to said RS demodulator and responsive to the RS-receiver signal, for compensating to the second frequency the RS-spread-spectrum signal of said RS-spread-spectrum transmitter located at said remote station; and an interference-reduction subsystem, located at said base station and at a front end to said BS-spread-spectrum receiver, for reducing, at the second frequency, the BS-channel-sounding signal from the RS-spread-spectrum signal arriving at said base station.

24. The improvement to the spread-spectrum system as set forth in claim 21, 22, or 23, with said BS transmitter transmitting the BS-channel-sounding signal at the second frequency, with the BS-channel-sounding signal having a bandwidth no more than ten per cent of the spread-spectrum bandwidth of the plurality of RS-spread-spectrum signals.

25. The improvement to the spread-spectrum system as set forth in claim 21, 22, or 23, with said BS transmitter transmitting the BS-channel-sounding signal at the second frequency, with the BS-channel-sounding signal having a bandwidth no more than five per cent of the spread-spectrum bandwidth of the plurality of RS-spread-spectrum signals.

26. The improvement to the spread-spectrum system as set forth in claim 21, 22, or 23, with said BS transmitter transmitting the BS-channel-sounding signal at the second frequency, with the BS-channel-sounding signal having a bandwidth no more than one per cent of the spread-spectrum bandwidth of the plurality of RS-spread-spectrum signals.

27. The method for improving the spread-spectrum system as set forth in claim 1, 2 or 3, with said interference-reduction subsystem including a notch filter for notch filtering the BS-channel-sounding signal from the plurality of RS-spread-spectrum signals.

28. The method for improving the spread-spectrum system as set forth in claim 4, with said interference-reduction subsystem including a notch filter for notch filtering the BS-channel-sounding signal from the plurality of RS-spread-spectrum signals.

29. The method for improving the spread-spectrum system as set forth in claim 5, with said interference-reduction subsystem including a notch filter for notch filtering the BS-channel-sounding signal from the plurality of RS-spread-spectrum signals.

30. The method for improving the spread-spectrum system as set forth in claim 6, with said interference-reduction subsystem including a notch filter for notch filtering the BS-channel-sounding signal from the plurality of RS-spread-spectrum signals.

31. The method for improving the spread-spectrum system as set forth in claim 7 or 8, with said interference-reduction means including a notch filter for notch filtering the BS-channel-sounding signal from the plurality of RS-spread-spectrum signals.

32. The method for improving the spread-spectrum system as set forth in claim 9, with said interference-reduction means including a notch filter for notch filtering the BS-channel-sounding signal from the plurality of RS-spread-spectrum signals.

33. The method for improving the spread-spectrum system as set forth in claim 10, with said interference-reduction means including a notch filter for notch filtering the BS-channel-sounding signal from the plurality of RS-spread-spectrum signals.

34. The method for improving the spread-spectrum system as set forth in claim 11, with said interference-reduction means including a notch filter for notch filtering the BS-channel-sounding signal from the plurality of RS-spread-spectrum signals.

* * * * *